(12) United States Patent
Sui et al.

(10) Patent No.: US 8,844,347 B2
(45) Date of Patent: Sep. 30, 2014

(54) SENSOR PORT INSERT APPARATUS

(75) Inventors: Lei Sui, Andover, MA (US); Nicholas Joseph Mollo, Wilmington, MA (US); Benjamin Edward McDonald, Holliston, MA (US); Toan Huu Nguyen, Needham, MA (US); Solomon Feldman, Brookline, MA (US); Nicholas Anderson Hobbs, Boston, MA (US); Ganesh Devkar, Hyderabad (IN); John Austin True, Holliston, MA (US); Mykhaylo Barsukov, Acton, MA (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 13/408,025

(22) Filed: Feb. 29, 2012

(65) Prior Publication Data

US 2013/0219707 A1    Aug. 29, 2013

(51) Int. Cl.
*G01R 3/00*    (2006.01)

(52) U.S. Cl.
USPC ............ 73/195; 29/595; 73/146.5; 73/196; 137/227; 137/551; 340/447

(58) Field of Classification Search
USPC ............... 73/146.5, 195, 196; 137/227, 551; 340/447; 29/595
See application file for complete search history.

(56) References Cited

U.S. PATENT DOCUMENTS

| | | | | |
|---|---|---|---|---|
| 3,732,728 | A | * | 5/1973 | Fitzpatrick ................. 340/854.4 |
| 5,853,020 | A | * | 12/1998 | Widner ......................... 137/227 |
| 6,475,151 | B2 | | 11/2002 | Koger et al. |
| 6,776,762 | B2 | | 8/2004 | Erikson et al. |
| 7,063,666 | B2 | | 6/2006 | Weng et al. |
| 7,103,960 | B2 | | 9/2006 | Aime |
| 7,398,160 | B2 | * | 7/2008 | Morrow et al. ................. 702/24 |
| 7,464,600 | B2 | * | 12/2008 | Kurtz et al. ..................... 73/714 |
| 7,669,479 | B2 | * | 3/2010 | Kurtz et al. ..................... 73/714 |
| 7,913,806 | B2 | | 3/2011 | Pabon et al. |
| 2008/0072877 | A1 | * | 3/2008 | Kurtz et al. .............. 123/406.55 |
| 2011/0247425 | A1 | * | 10/2011 | Moldenhauer .................. 73/753 |
| 2011/0247431 | A1 | * | 10/2011 | Moldenhauer ............. 73/861.58 |
| 2011/0259600 | A1 | * | 10/2011 | Segura et al. .................. 166/374 |

* cited by examiner

*Primary Examiner* — Carl Arbes
(74) *Attorney, Agent, or Firm* — Hiscock & Barclay LLP (57) ABSTRACT

An insert apparatus for installing a transducer assembly in a sensor port of a flow cell is disclosed. The transducer assembly is installed in the cavity of the insert body without the use of glues or adhesives to bond the transducer assembly to the cavity.

21 Claims, 6 Drawing Sheets

SENSOR PORT INSERT APPARATUS

BACKGROUND OF THE INVENTION

The subject matter disclosed herein relates to an insert apparatus for installing a transducer assembly in a sensor port of a flow cell.

Flow meters, including ultrasonic flow meters, are used to determine the characteristics (e.g., flow rate, pressure, temperature, etc.) of liquids, gases, etc. flowing in conduits of different sizes and shapes. Knowledge of these characteristics of the fluid can enable other physical properties or qualities of the fluid to be determined. For example, in some custody-transfer applications, the flow rate can be used to determine the volume of a fluid (e.g., oil or gas) being transferred from a seller to a buyer through a conduit to determine the costs for the transaction, where the volume is equal to the flow rate multiplied by the cross sectional area of the conduit.

In one type of ultrasonic flow meter employing transit time flow metering, one or more pairs of ultrasonic transducer assemblies can be installed in sensor ports of a flow cell. Each pair of ultrasonic transducer assemblies can contain transducer assemblies located upstream and downstream from each other forming an ultrasonic path between them at particular chordal locations across the conduit. Each transducer assembly, when energized, transmits an ultrasonic signal (e.g., a sound wave) along an ultrasonic path through the flowing fluid that is received by and detected by the other transducer assembly. The path velocity of the fluid averaged along the ultrasonic path at a particular chordal location can be determined as a function of the differential between (1) the transit time of an ultrasonic signal traveling along the ultrasonic path from the downstream transducer upstream to the upstream transducer against the fluid flow direction, and (2) the transit time of an ultrasonic signal traveling along the ultrasonic path from the upstream transducer downstream to the downstream transducer with the fluid flow direction.

Transducer assemblies can be installed in sensor ports of flow cells using insert assemblies that are mounted within the sensor ports. Since the transducer assemblies are bonded to the cavity of the insert body using glue or another adhesive, when the transducer assembly fails or must be replaced, the transducer assembly cannot easily be removed from and replaced within the insert assembly. For example, after removal of the transducer assembly, the remaining glue or adhesive will negatively impact the performance of any replacement transducer assembly installed within the insert assembly. Accordingly, the entire or a substantial part of the insert assembly often must be removed in order to replace a transducer assembly. The removal of the insert assembly may require a shutdown of the system that the flow cells are monitoring to remove the fluid and pressure from the flow cell.

The discussion above is merely provided for a general background information and is not intended to be used as an aid in determining the scope of the claimed subject matter.

BRIEF DESCRIPTION OF THE INVENTION

An apparatus for installing a transducer assembly in a sensor port of a flow cell is disclosed. The transducer assembly is installed in the cavity of the insert body without the use of glues or adhesives to bond the transducer assembly to the cavity. An advantage that may be realized in the practice of some of the disclosed embodiments of the sensor port insert apparatus is that a transducer assembly can be more easily replaced in the field without having to remove the fluid and pressure from a flow cell.

In one embodiment, an apparatus for installing a transducer assembly in a sensor port of a flow cell is disclosed. The apparatus comprises an insert body configured for insertion into the sensor port, the insert body defines a cavity having a opening located at a first end of the insert body and an ultrasonic buffer at a second end of the insert body, a transducer assembly located in the cavity of the insert body, the transducer assembly comprises a housing having a first end, a second end proximate to the ultrasonic buffer opposite of the first end of the housing, and a piezoelectric crystal located in the second end of the housing, a holding nut located in the cavity proximate to the first end of the housing applying a compressive force to the housing to keep the second end of the housing proximate to the ultrasonic buffer, a coupling material in fluid form located in an area between the second end of the housing and the ultrasonic buffer, and a first o-ring located in the cavity proximate to the housing to assist in preventing the leakage of the coupling material from the area between the housing and the ultrasonic buffer.

In another embodiment, the apparatus comprises an insert body configured for insertion into the sensor port, the insert body defines a cavity having a opening located at a first end of the insert body and an ultrasonic buffer at a second end of the insert body, a transducer assembly located in the cavity of the insert body, the transducer assembly comprises a housing having a first end, a second end having an exterior surface in contact with an interior surface of the ultrasonic buffer opposite of the first end of the housing, and a piezoelectric crystal located proximate to the interior surface of the second end of the housing, and a holding nut located in the cavity proximate to the first end of the housing applying a compressive force to the housing to keep the second end of the housing in contact with the ultrasonic buffer, wherein the exterior surface of the second end of the housing and the interior surface of the ultrasonic buffer are polished to eliminate voids between the exterior surface of the second end of the housing and the interior surface of the ultrasonic buffer when the exterior surface of the second end of the housing is in contact with the interior surface of the buffer.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Differences between otherwise like parts may cause to those parts to be indicated with different numerals. Different parts are indicated with different numerals. Thus, for further understanding of the invention, reference can be made to the following detailed description, read in connection with the drawings in which.

DETAILED DESCRIPTION OF THE INVENTION

Figure 1:
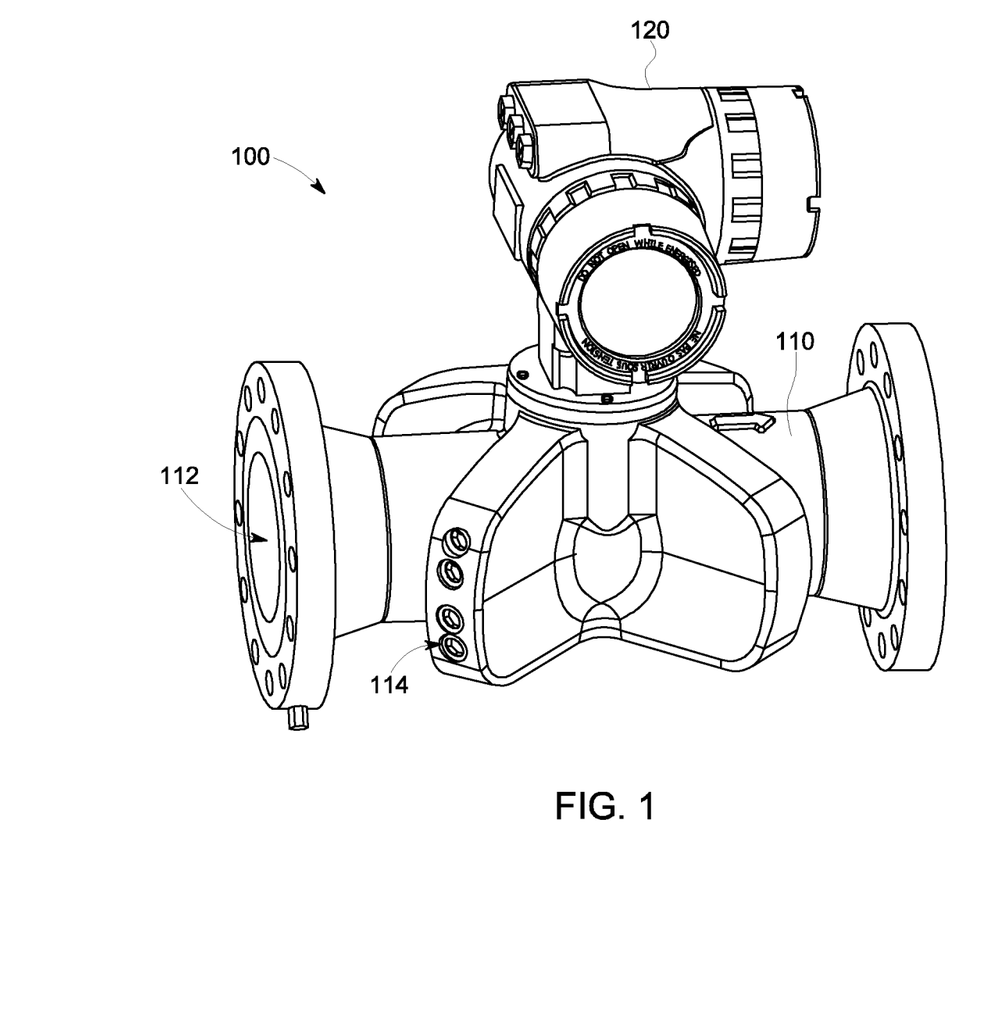
FIG. 1 is a perspective view of an exemplary flow cell assembly.
Figure 2:
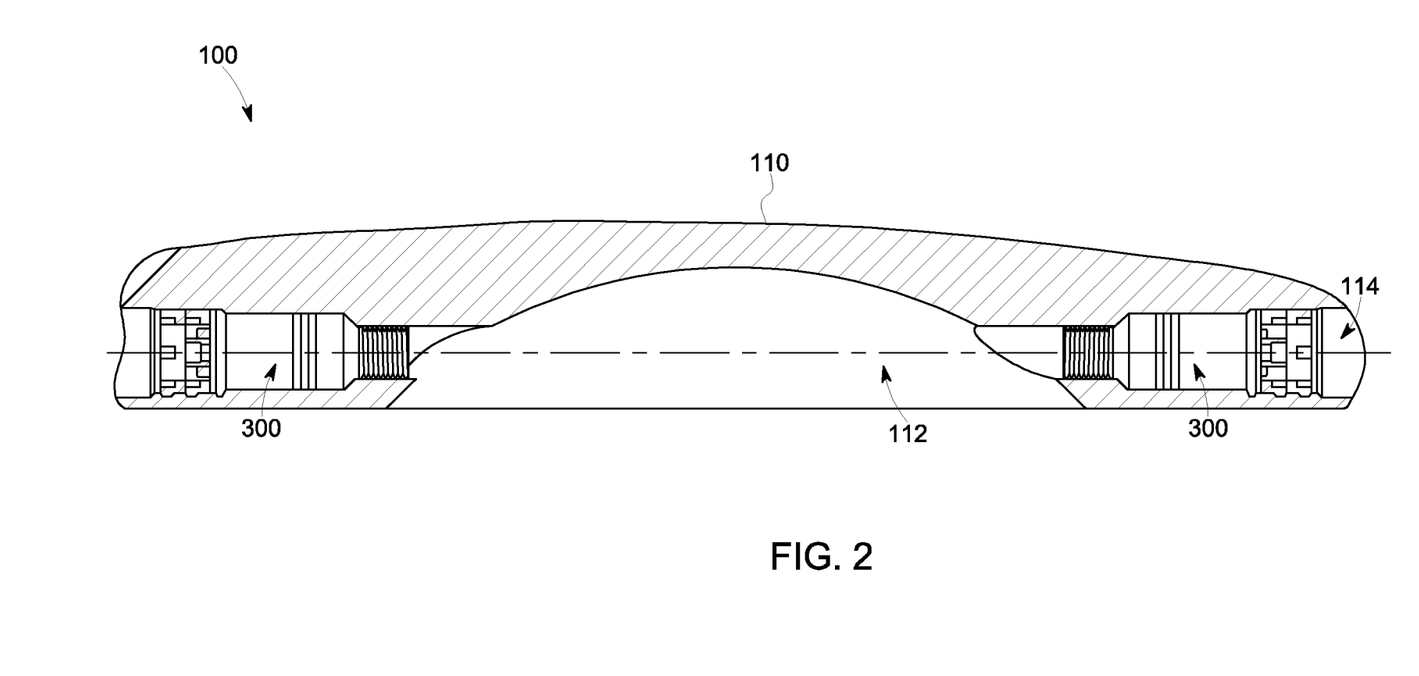
FIG. 2 is a cross-section of the exemplary flow cell assembly of FIG. 1.

FIG. 1 is a perspective view of an exemplary flow cell assembly 100. FIG. 2 is a cross-section of the exemplary flow cell assembly 100 of FIG. 1. The exemplary flow cell assembly 100 includes a flow cell 110 having a flow cell bore 112 through which fluid can flow. The flow cell 110 has a plurality of sensor ports 114 in which a sensor port insert apparatus 300 (FIG. 3) is installed. As seen in FIG. 2, the sensor port 114 of the exemplary flow cell 110 is shaped so as to receive and place the exemplary sensor port insert apparatus 300 in physical contact with the fluid in the flow cell bore 112 of the flow cell 110. An ultrasonic signal transmitted from one sensor port insert apparatus 300 travels through the fluid within the flow cell bore 112 and is received by the other sensor port insert apparatus 300. The plurality of sensor port insert apparatuses 300 are connected to the flow meter 110 to determine the flow rate of the fluid.

Figure 3:
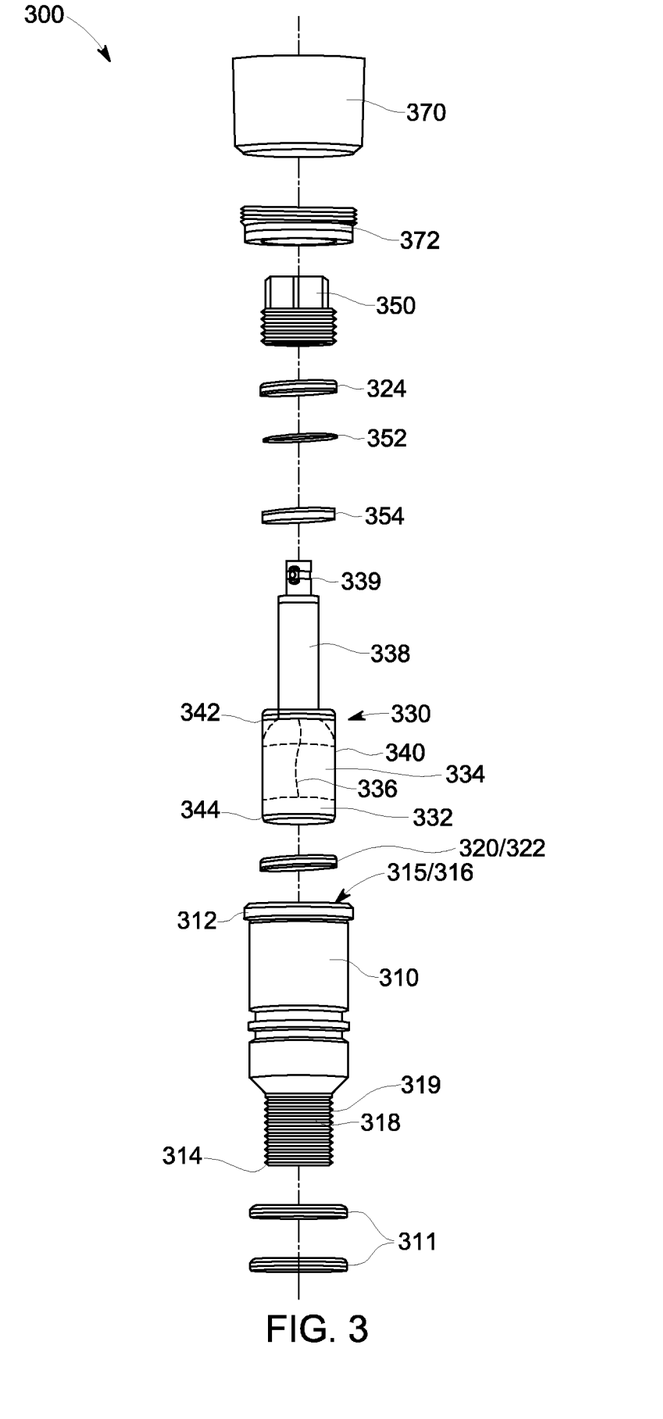
FIG. 3 is an exploded view of an exemplary sensor port insert apparatus.
Figure 4:
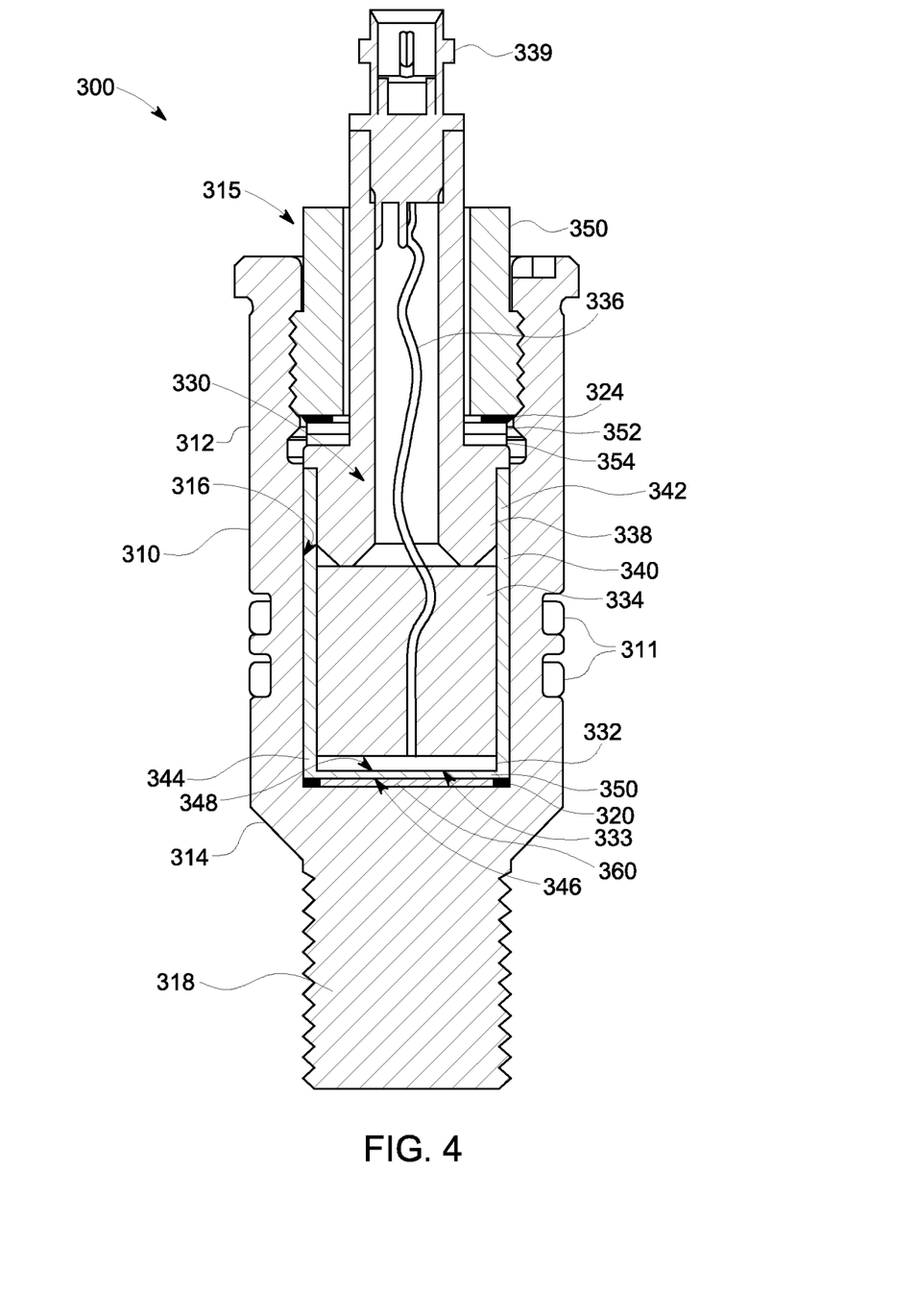
FIG. 4 is a cross-section of the exemplary sensor port insert apparatus of FIG. 3.

FIG. 3 is an exploded view of an exemplary sensor port insert apparatus 300. FIG. 4 is a cross-section of the exemplary sensor port insert apparatus 300 of FIG. 3 in one configuration. The sensor port insert apparatus 300 is designed to be installed into the sensor ports 114 of the exemplary flow cell 110 of FIG. 1.

In one embodiment, the sensor port insert apparatus 300 includes an insert body 310 configured for insertion into the sensor port 114 of the flow cell 110 (FIG. 1). The insert body 310 can have an external surface that includes threads 319 or concentric grooves designed to dampen acoustic reflections/ring downs in the ultrasonic buffer 318 of the insert body 310. In one embodiment, the threads 319 of the insert body 310 can be designed to be engaged with an interior threaded surface of a sensor port 114. One or more o-rings 311 can be installed on the exterior of the insert body 310 to provide a seal between the exterior of the insert body 310 and the sensor port 114.

The insert body 310 defines a cavity 316 (FIG. 4) having an opening 315 located at a first end 312 of the insert body 310. The second end 314 of the insert body includes an ultrasonic buffer 318. A transducer assembly 330 is located in the cavity 316 of the insert body 310 proximate to the ultrasonic buffer 318 for transmitting and receiving ultrasonic signals that travel through the fluid within the flow cell bore 112. In one embodiment, the transducer assembly 330 includes a housing 340 having a second end 344 proximate to the ultrasonic buffer 318 and a first end 342 opposite of the second end 340. In one embodiment, the first end 342 of the housing 340 is proximate to the opening 315 of the cavity 316. As used herein, where a first component is referred to as being located in another component, it will be understood that only a portion or all of the first component can be located in the other component. The transducer assembly 330 also includes a piezoelectric crystal 332 located in the second end 344 of the housing 340. The face 333 of the piezoelectric crystal 332 can be installed proximate to the interior surface 348 of the second end 344 of the housing 340. The exterior surface 346 or face of the second end 344 of the housing 340 is proximate to the ultrasonic buffer 318. The transducer assembly 330 can transmit and receive ultrasonic signals into and from the fluid to be measured through the ultrasonic buffer 318 of the insert body 310.

The first end 342 of the housing 340 can include a back stem 338 for routing a wire 336 from the piezoceramic crystal 332 to a connector 339 (e.g., a BNC connector). In one embodiment, a backing member 334 (e.g., made from epoxy) can be attached to the piezoelectric crystal 332 and located in the housing 340 of the transducer assembly 330. The wire 336 can extend from the piezoelectric crystal 332 through the backing member 334 to the back stem 338 of the transducer assembly 330.

Referring again to FIGS. 3 and 4, the transducer assembly 330 can be held in place by a transducer holding nut 350 located in the cavity 316 proximate to the first end 342 (e.g., the back stem 338) of the housing 340 applying a compressive force to the housing 340. The compressive force of the transducer holding nut 350 against the housing 340 keeps the second end 344 of the housing 340 proximate to the ultrasonic buffer 318. The transducer holding nut 350 can have an external surface that includes threads designed to be engaged with an interior threaded surface of the insert body 310. In one embodiment, a disc spring 352 (e.g., Bellville washer) and a washer 354 can be installed between the transducer holding nut 350 and the first end 342 of the housing 340. In the event the transducer holding nut 350 loses some of its compression against the first end 342 of the housing 350 (e.g., if it rotates backwards out of the cavity 316 of the insert body 310), the disc spring 352 can provide additional compression against the housing 340 to keep the second end 344 of the housing 340 proximate to the ultrasonic buffer 318. In another embodiment, a transducer holding nut o-ring 324 can be installed between the transducer holding nut 350 and the first end 342 of the housing 340 to keep external elements (e.g., moisture, air) from entering the cavity 316 of the insert body 310. An insert holding nut 372 can be threaded into the interior of the sensor port 114 to hold the insert body 310 in place. A plug 370 can be used to seal the sensor port 114.

Referring to FIG. 4, in one embodiment, a coupling material 360 is located between the second end 344 of the housing 340 and the ultrasonic buffer 318. The coupling material 360 can provide a conductive medium for the ultrasonic signals between the exterior surface 346 of the second end 344 of the housing 340 and the ultrasonic buffer 318 by effectively coupling the piezoelectric crystal 333 to the ultrasonic buffer 318. In one embodiment, the coupling material 360 is fluid form (e.g., liquid, gel, etc.), and can fill voids and displace air that could otherwise be located between the housing 340 and the ultrasonic buffer 318 that would interfere with the transmission quality of an ultrasonic signal passing through this location.

In one embodiment, the coupling material 360 is a composition including a room temperature vulcanizing (RTV) silicone material. Other types of coupling materials 360 can be employed as long as the material does not cause any significant interference with the quality of ultrasonic signals passing through it. In addition, the coupling material 360 should not have high adhesive properties to avoid bonding between the transducer assembly 330 and the insert body 310 to allow replacement of the transducer assembly 330.

Since the coupling material 360 remains a fluid, it may be susceptible to leakage from the area between the second end 344 of the housing 340 and the ultrasonic buffer 318. As discussed, the transducer holding nut o-ring 324 can be installed between the transducer holding nut 350 and the first end 342 of the housing 340 to keep external elements (e.g., moisture, air) from entering the cavity 316 of the insert body 310 and potentially causing evaporation of the coupling material 360. As shown in FIG. 4, a face o-ring 320 can be located within the cavity 316 of the insert body 310 proximate to the second end 344 of the housing 340 to assist in preventing the leakage of the coupling material 360 from the area between the second end of the housing 344 and the ultrasonic buffer 318. In one embodiment, the face o-ring 320 wraps around the perimeter of the exterior surface 346 of the second end 344 of the housing 340. In one embodiment, the face o-ring 320 is located in a groove in the exterior surface 346 of the second end 344 of the housing 340 to accommodate engagement between the face o-ring 320 and the housing 340. In another embodiment, the face o-ring 320 is located in a groove in the insert body 310 on the ultrasonic buffer 316.

Figure 5:
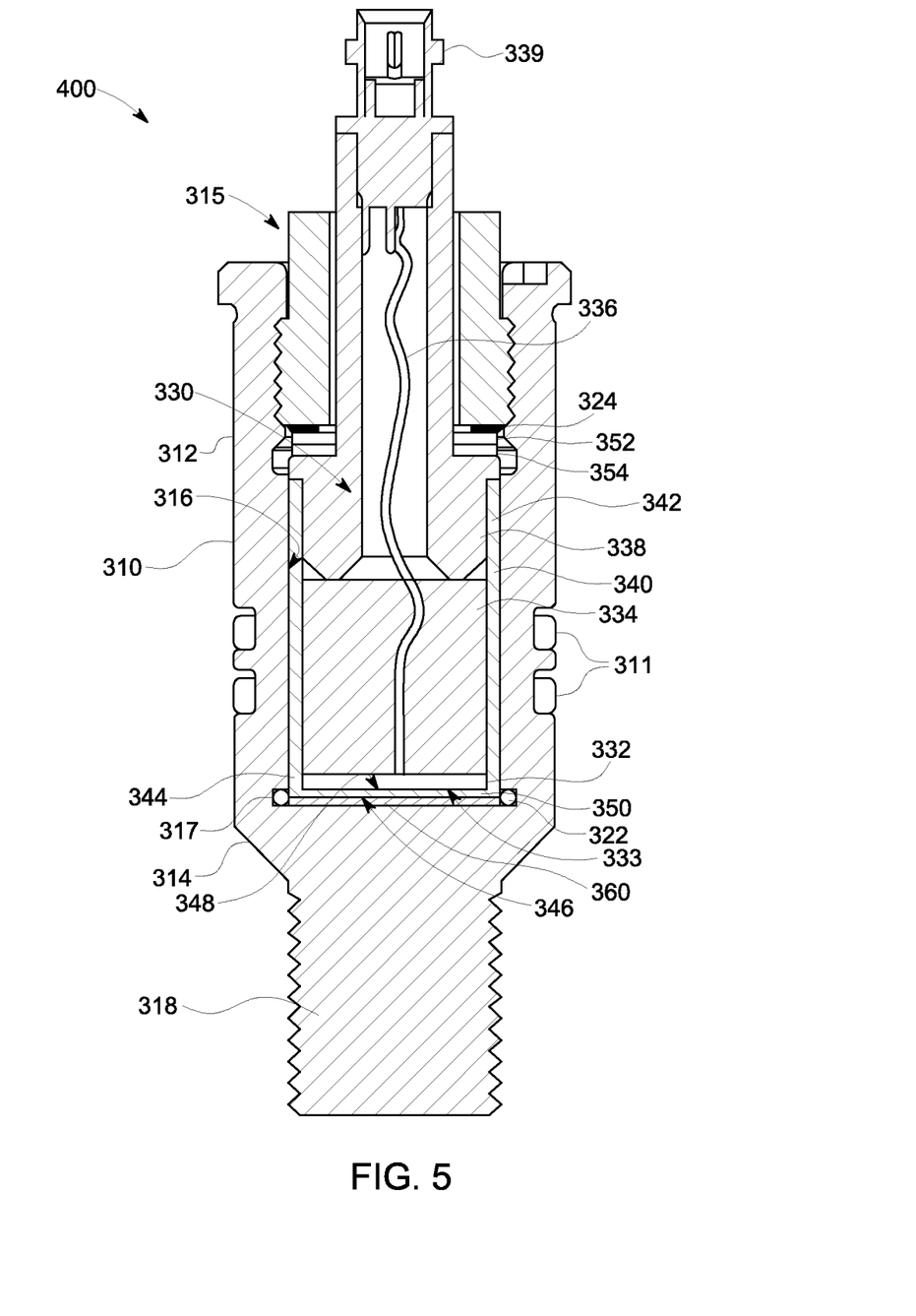
FIG. 5 is a cross-section of another exemplary sensor port insert apparatus.

FIG. 5 is a cross-section of another exemplary sensor port insert apparatus 400. As shown in FIG. 5, a groove 317 in the cavity 316 of the insert body 310 proximate to the exterior surface 346 of the second end 344 of the housing 340 is provided. A insert groove o-ring 322 is installed in the groove 317 to assist in preventing the leakage of the coupling material 360 from the area between the second end of the housing 344 and the ultrasonic buffer 318. In other embodiments, the insert groove o-ring 322 and associated groove 317 can be located closer to the transducer holding nut 350 (e.g., anywhere proximate to the transducer housing 340) to enable more coupling material to be stored within the cavity 316 of the transducer assembly 300 while surrounding the exterior surface 346 of the second end 344 of the housing 340. In another embodiment, the insert groove o-ring 322 could be located between the holding nut 350 and the first end 342 of the housing 340 (e.g., between the holding nut 350 and the back stem 338) to provide the required sealing.

Figure 6:
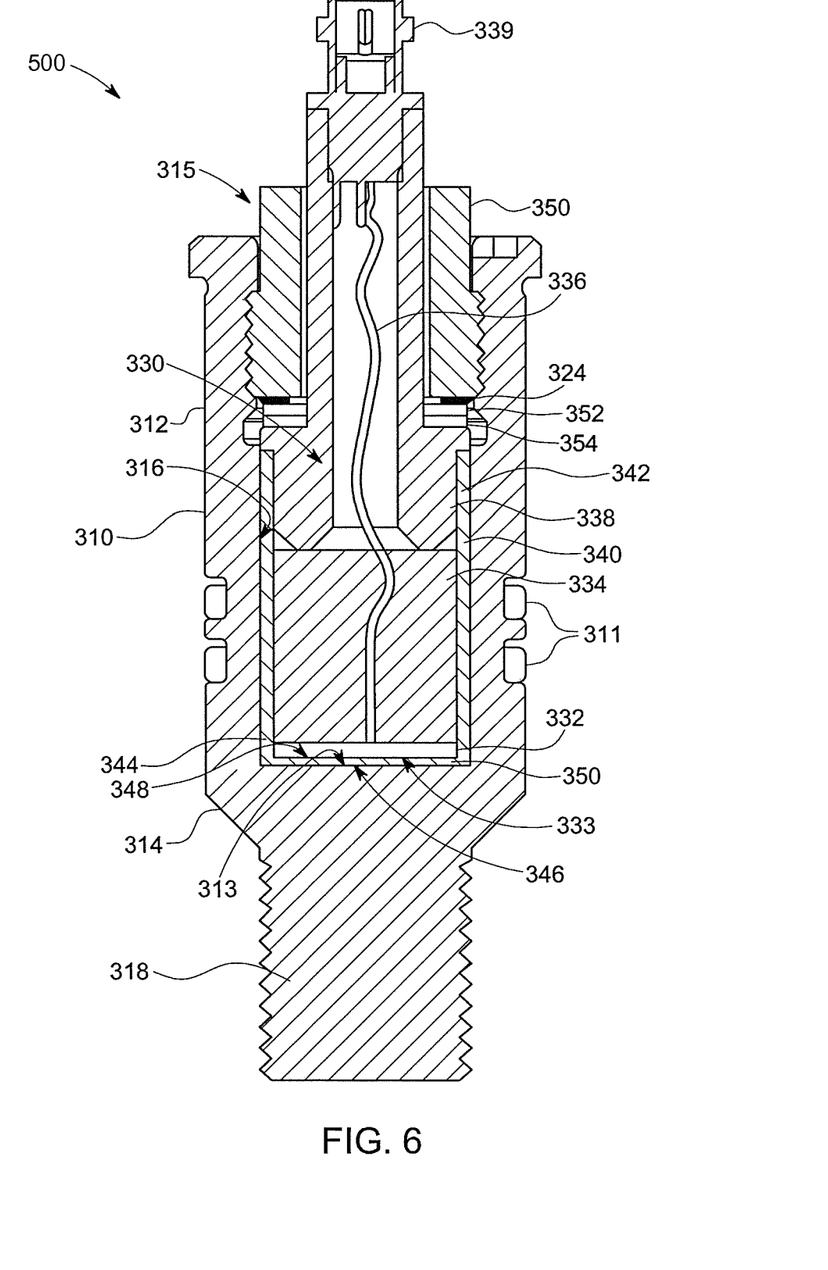
FIG. 6 is a cross-section of yet another exemplary sensor port insert apparatus.

FIG. 6 is a cross-section of yet another exemplary sensor port insert apparatus 500. Unlike the embodiments shown in FIGS. 4 and 5, the sensor port insert apparatus 500 of FIG. 6 does not use coupling material 360, eliminating the need for a face o-ring 320 or an insert groove o-ring 322. The face 333 of the piezoelectric crystal 332 can be installed proximate to the interior surface 348 of the second end 344 of the housing 340. As in FIGS. 4 and 5, transducer assembly 330 can be held in place by a transducer holding nut 350 applying a compressive force to the housing 340 to keep the exterior surface 346 of the second end 344 of the housing 340 in contact the ultrasonic buffer 318. In the event the transducer holding nut 350 loses some of its compression against the first end 342 of the housing 350, the disc spring 352 can provide additional compression against the housing 340 to keep the exterior surface 346 of the housing 340 in contact with the ultrasonic buffer 318. Instead of using the coupling material, the exterior surface 346 of the second end 344 of the housing 340 in contact with the interior surface 313 of the ultrasonic buffer 318 is polished, and the interior surface 313 of the ultrasonic buffer 318 in the cavity 316 is polished. The polishing eliminates voids and displaces air that could otherwise be located between the exterior surface 346 of the second end 344 of the housing 340 and the interior surface 313 of the ultrasonic buffer 318 when the exterior surface 346 of the second end 344 of the housing 340 contacts the interior surface 313 of the buffer 318.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus including a transducer assembly in a sensor port of a flow cell comprising:
    an insert body configured for insertion into the sensor port, the insert body comprises a cavity having an opening at a first end of the insert body and an ultrasonic buffer forming a second end of the insert body opposite the first end of the insert body;
    a transducer assembly configured for insertion through the opening and into the cavity of the insert body, the transducer assembly comprising:
    a housing having a first end and a second end opposite the first end of the housing, an exterior surface of the second end of the housing adjacent the ultrasonic buffer when the transducer assembly is inserted into the cavity, and
    a piezoelectric crystal disposed inside the housing and abutting an interior surface of the second end of the housing;
    a coupling material in fluid form abutting both the exterior surface of the second end of the housing and the ultrasonic buffer for ultrasonically coupling the piezoelectric crystal to the ultrasonic buffer;
    a holding nut located in the cavity proximate to the first end of the housing for applying a compressive force to the housing to keep the exterior surface of the second end of the housing compressed against the coupling material; and
    a first o-ring located in the cavity and abutting both the housing and the insert body to assist in preventing the leakage of the coupling material from between the exterior surface of the second end of the housing and the ultrasonic buffer.

2. The apparatus of claim 1, wherein the first o-ring is located between the second end of the housing and the ultrasonic buffer.

3. The apparatus of claim 1, wherein the first o-ring wraps around the second end of the housing.

4. The apparatus of claim 1, wherein the first o-ring is located in a groove in the second end of the housing.

5. The apparatus of claim 1, further comprising a groove on the ultrasonic buffer, wherein the first o-ring is located in the groove.

6. The apparatus of claim 1, further comprising a groove in the insert body proximate to the second end of the housing, wherein the first o-ring is located in the groove.

7. The apparatus of claim 1, further comprising a groove in the insert body proximate to the first end of the housing, wherein the first o-ring is located in the groove.

8. The apparatus of claim 1, wherein the first o-ring is located between the holding nut and the first end of the housing.

9. The apparatus of claim 1, wherein the coupling material is a liquid or a gel.

10. The apparatus of claim 1, wherein the coupling material is a composition including a room temperature vulcanizing (RTV) silicon.

11. The apparatus of claim 1, further comprising a second o-ring between the holding nut and the first end of the housing.

12. The apparatus of claim 1, further comprising a disc spring between the holding nut and the first end of the housing.

13. The apparatus of claim 12, wherein the disc spring is a Belleville washer.

14. The apparatus of claim 1, wherein the first end of the housing comprises a back stem.

15. The apparatus of claim 1, wherein the holding nut comprises an external surface that includes threads, the insert body comprises threads in the cavity, and wherein the threads on the external surface of the holding nut are designed to be engaged with the threads in the cavity of the insert body to apply the compressive force to the housing.

16. The apparatus of claim 1, wherein the insert body has an external surface comprising threads designed to be engaged with an interior threaded surface of the sensor port.

17. An apparatus including a transducer assembly in a sensor port of a flow cell comprising:
   an insert body configured for insertion into the sensor port, the insert body comprises a cavity having an opening located at a first end of the insert body and an ultrasonic buffer at a second end of the insert body;
   a transducer assembly located in the cavity of the insert body, the transducer assembly comprises a housing having a first end, a second end having an exterior surface in contact with an interior surface of the ultrasonic buffer opposite of the first end of the housing, and a piezoelectric crystal located proximate to the interior surface of the second end of the housing; and
   a holding nut located in the cavity proximate to the first end of the housing applying a compressive force to the housing to keep the second end of the housing in contact with the ultrasonic buffer,
   wherein the exterior surface of the second end of the housing and the interior surface of the ultrasonic buffer are polished to eliminate voids between the exterior surface of the second end of the housing and the interior surface of the ultrasonic buffer when the exterior surface of the second end of the housing is in contact with the interior surface of the buffer.

18. The apparatus of claim 17, further comprising a second o-ring between the holding nut and the first end of the housing.

19. The apparatus of claim 17, further comprising a disc spring between the holding nut and the first end of the housing.

20. The apparatus of claim 19, wherein the disc spring is a Belleville washer.

21. The apparatus of claim 17, wherein the holding nut comprises an external surface that includes threads, the insert body comprises threads in the cavity, and wherein the threads on the external surface of the holding nut are designed to be engaged with the threads in the cavity of the insert body to apply the compressive force to the housing.

* * * * *